United States Patent Office 3,761,411
Patented Sept. 25, 1973

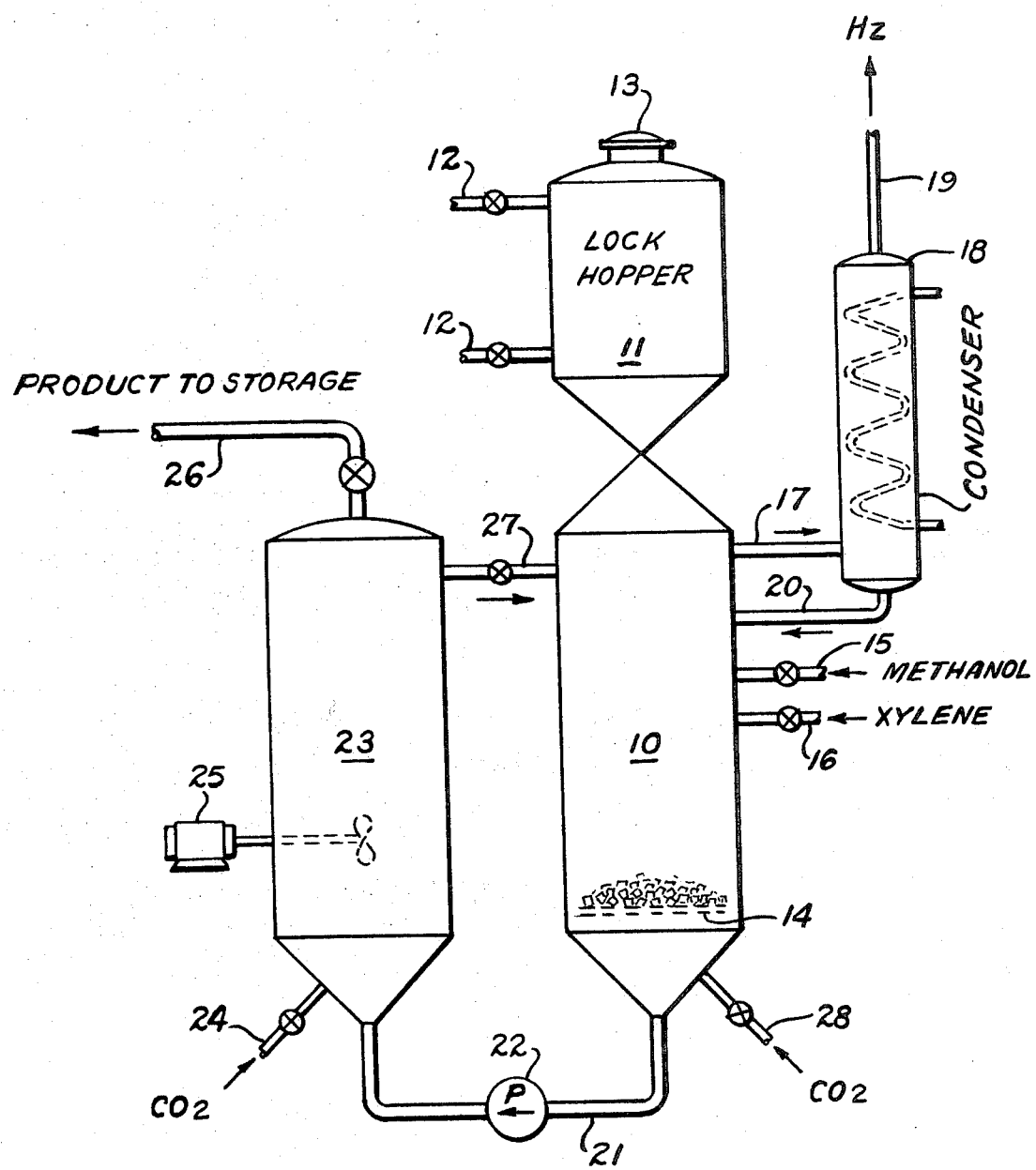

3,761,411
NON-AQUEOUS SOLUTIONS OF
MAGNESIUM SALTS
Charles R. Dickey, 480 W. Rowland Ave.,
Covina, Calif. 91722
Filed June 21, 1971, Ser. No. 154,856
Int. Cl. C10m 1/32, 1/54
U.S. Cl. 252—42.7                          10 Claims

ABSTRACT OF THE DISCLOSURE

Magnesium metal is dissolved in methanol and, simultaneously or immediately thereafter, the solution is carbonated to produce a stable, clear solution free of flocculent insoluble magnesium hydrates. The clear solution can be blended with oils containing surface active agents such as magnesium sulfonate, then stripped free of methanol, to give clear, basic solutions without filtering; suitable for lubricating oil additives.

This invention relates to a novel method of preparing a solution of a magnesium salt in which the magnesium is combined with methanol and carbon dioxide in the form of a complex compound which has great hydrolytic stability and can be stored indefinitely until needed. The clear solution, uncontaminated by insoluble material difficult to remove by filtration, is suitable for blending with oils, such as lubricating oils, hydraulic oils, etc., in the presence of oil soluble dispersants, then stripped free of solvent, giving a clear, colloidal dispersion of magnesium carbonate in oil, having valuable properties as a corrosion preventive, extreme pressure lubricant, sludge preventive, etc.

The invention is illustrated by a drawing which shows schematically an apparatus suitable for carrying out the process.

One object of the invention is to prepare a methanolic solution of magnesium stable to storage for prolonged periods of time. Another object of the invention is to prepare a methanolic solution of magnesium which is brilliantly clear and free of floc which usually occurs when magnesium is dissolved in methanol. Another object of the invention is to prepare a methanolic solution of magnesium which is insensitive to small amounts of water such as is present in most commercially available methanol. Yet another object of the invention is to produce a basic magnesium sulfonate free of visible solids without troublesome filtration ordinarily required to remove insoluble magnesium salts.

Heretofore, it has been the practice in preparing high base magnesium sulfonate to dissolve the metal in methanol and add the murky solution to a solution of magnesium sulfonate in lubricating oil, then treat with carbon dioxide and strip out the methanol. By this method, it was possible to make a concentrate having a base number of 300 or more. However, insoluble matter from the methanol solution caused a great deal of trouble because of its fine particle size and flocculent structure making the oil concentrate difficult to filter, even with large amounts of filter aid, usually diatomaceous earth. The source of the flocculent material seemed to be the oxide film on the surface of the metal and, more importantly, the interaction of trace amounts, e.g. 0.1 to 0.3% of water in the methanol giving rise to formation of hydrated magmagnesium methylate having the probable formula: $Mg(OH)OCH_3$. When freshly prepared, these compounds appear to remain in solution, but, on standing, owing to rearrangement, dissociation of hydrogen, or other action not fully understood, they become insoluble and the solution becomes cloudy with a microscopically fine flocculent material almost impossible to remove by filtration or settling. When such a solution is incorporated into an oil as in the preparation of an overbased sulfonate, the product is cloudy and not acceptable to the lubricating oil market.

I have now discovered that if $CO_2$ is injected into the reaction when dissolving magnesium in methanol or into the fresh solution of magnesium methylate, no insoluble floc is formed or, if formed, it rapidly dissolves to give a clear solution except for a trace of dark colored contaminants from the magnesium metal particularly iron. Initiation of the reaction between the magnesium metal and methanol is often slow and can be speeded in several ways. Presence of only traces of water in the methanol will inhibit the start of the reaction. Accordingly, it is desirable to start the reaction with methanol which has been in contact previously with active magnesium. Amalgamation of a small amount, e.g. 10 grams, of the magnesium can serve as a starter. Once the reaction is well initiated, it can become violent, especially if magnesium turnings or other finely divided metal is used. I prefer to use metal in the form of rods or ingots presenting a limited surface or better control of the reaction. In any case, the reaction can be stopped by withdrawing the methanol from the metal.

Hydrogen is a by-product of the reaction and means must be provided for its release and venting from the reaction vessel. Inasmuch as a great deal of heat is evolved in the reaction, the methanol soon reaches the boiling point and methanol vapors escape with the hydrogen. To prevent loss of valuable methanol, they should be condensed and the methanol returned to the reactor. This serves to cool the reactor and control the rate of metal solution. The reaction is generally accepted to be:

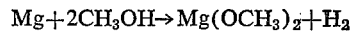

Where insufficient methanol is present, the product methylate will separate, especially on cooling, as a white gelatinous solid which can clog the apparatus if steps are not taken to avoid it. This action may also coat the surface of the metal, deactivating it. I have found that the introduction of a volatile aromatic hydrocarbon solvent into the reaction, preferably benzene, toluene or xylene, for example, serves to prevent separation of methylate, apparently by increasing the solubility. For this purpose, I usually use about 25 to 50% by volume of xylene with the methanol, based on the mixture.

Injecting $CO_2$ into the reactor also serves to convert the methylate to a more stable form of compound with increased solubility. Thus, $CO_2$ increases the rate of solution of metal and, whereas the methylate solution will, on prolonged standing, separate a white precipitate, the carbonated solution will remain perfectly clear as shown in the following example:

EXAMPLE 1

A solution of magnesium in a mixture of methanol and xylene, 50–50 by volume, was prepared clear and stored for eighteen months in a 1 gallon stoppered glass bottle. Analysis by titration with standard acid was 94 alkali value (mg. KOH per gram) when prepared and 92 eighteen months later. The solution remained perfectly clear throughout the period. Analysis indicated a ratio of 2 mols $CO_2$ to 3 atoms of magnesium. This suggests the formula:

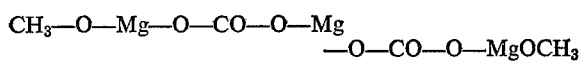

The following example will show the use of this aged solution in overbasing a neutral calcium mahogany sulfonate containing about 40% of oil, suitable for adding to motor oils:

EXAMPLE 2

To 20 grams of neutral calcium sulfonate analyzing 9.82% sulfated ash and 2.8% neutral calcium (Q.A.S.) was added 50 cc. xylene, then 85 cc. of the above solution, the amount calculated to give an oil of 300 alkali value. Methanol was boiled off with $CO_2$ gas to assist stripping. At 220° F., gelling occurred. Water was then added to hydrate the gel, first adding about 2 cc., then later 3 cc. to insure complete hydration. I have found that, when conducting the operation in large batches, it is desirable to introduce the water in stages, the amount used in the initial stage being one-half that stoichiometrically equivalent to the magnesium present, e.g., 1 mol water to each atom of magnesium in the carbonated complex. Then more water, usually an equal amount, is added to insure complete hydration. The mixture was then heated to drive off water and xylene, stripping with $CO_2$ at 380° F. The hot clear oil was passed through a filter to remove any dirt acquired from the apparatus, then titrated with standard acid using methyl orange indicator. The alkali value was 290.

EXAMPLE 3

Into a container were placed 10 grams magnesium metal in the form of turnings. Methanol previously dried with active magnesium was then added in the amount of 100 grams. Then 40 grams xylene were added. The reaction started very slowly as evidenced by slight evolution of hydrogen. $CO_2$ was then bubbled into the container and the reaction proceeded more rapidly. After one hour, 50 cc. more methanol was added to replace that lost by evaporation. From time to time, more methanol was added in the amount of 300 cc. before all metal had dissolved to give a cloudy solution. The solution was then placed in a closed container and subjected to $CO_2$ under moderate pressure to saturate it. After two hours, it became perfectly clear.

In place of the sulfonates, other oil soluble dispersing agents, preferably of the anionic type, can be used such as the phosphonates of Group 2 metals made by treating olefines of 12 to 30 carbon atoms with a sulfide of phosphorous, e.g. $P_2S_5$, followed by hydrolysis and neutralization. The oil soluble alkyl phenates and phenol sulfides can also be employed as well as the soaps of Group 2 metals, particularly magnesium, calcium, and barium with carboxylic acids such as oleic, stearic, and phenyl stearic acids. Alkyl succinates having about 12 to 30 carbon atoms in the alkyl substituents are also effective.

Referring to the drawing, the reactor 10 is charged with magnesium metal, preferably ingots or rods—usually of 1 inch to 4 inch diameter broken into short pieces. By means of lock hopper 11, recharging can be done at intervals during the reaction run, thus making the process continuous. Vent connections 12 are provided to purge the hopper with inert gas such as nitrogen or $CO_2$ when necessary to refill the hopper through sealed charge door 13. A screen or perforated plate 14 in the bottom of reactor 10 supports the charge of metal. Methanol is introduced through line 15 sufficient to flood the metal. Xylene or other aromatic solvent can be charged through line 16.

As the reaction proceeds, the temperature rises to the boiling point of methanol—about 150-160° F.—and hydrogen gas is discharged through line 17 leading to condenser 18, thence through vent 19 to waste or other use, e.g.: as a fuel gas. Liquid ammonia or other refrigerant coils in condenser 18 condense methanol vapor and the recovered methanol liquid returns to the reactor by line 20.

In reactor 10, the magnesium methylate solution flows downward toward the outlet 21 where it is withdrawn by pump 22 and charged to carbonator 23. $CO_2$ is injected by line 24 into carbonator 23 where it is absorbed into the methylate solution as hereinabove described. Mixer 25 assists in the absorption. Carbonated product solution and any unabsorbed $CO_2$ exit by line 26 to a receiver, not shown, from which any excess $CO_2$ can be recovered and recycled. As desired, the solution can be recycled to the reactor by line 27 to increase the concentration to near the point of saturation, usually about 200 A.V., depending on the temperature. Much higher concentrations of metal can be achieved when the methylate is carbonated, as compared with un-carbonated methylate. If desired, $CO_2$ can be injected directly into the reactor 10 by line 28 where it rapidly dissolves in the freshly formed methylate flowing downward through the reactor. In this manner, it also serves to purge hydrogen from the solution and assist the removal of methylate from the metal resting on the screen 14.

When it is desired to shut down the reaction, this can be accomplished by shutting off the flow of methanol to the reactor and withdrawing the solution through line 21. This leaves the tower 10 filled with hydrogen and, if desired, it can be filled with hydrocarbon solvent for safety. During the reaction, heat is dissipated by evaporation of part of the methanol which is condensed and recycled as above described. Addition of fresh metal from lock hopper 11 avoids the problem of activation or induction period, inasmuch as the active metal remaining in the reactor, usually 20 to 60 percent of the volume, activates or "infects" the fresh charge.

Colloidal magnesium oxide or hydroxide dispersions in methanol are notoriously sensitive to water as indicated hereinabove. When carbonated, however, I have discovered that they will tolerate as much as five percent or more of water in the methanol and still remain clear. I have discovered, however, that there is a definite limit to the amount of water that can be tolerated when the solution is added to an oil-sulfonate, then heated to evaporate the water and methanol. In one experiment, I added a clear solution of carbonated magnesium methylate containing 8% water to magnesium sulfonate in oil, then heated to evaporate methanol. The amount of water present was 40% of the weight of oil-sulfonate. Coagulation resulted and the product was a stiff gel—not the desired oil dispersion.

I have discovered definite advantage in commercial preparation of high base sulfonate, resulting when water is added to the carbonated methylate solution in the amount of one mol of water per atom of magnesium. It is desirable to add the water to the methylate solution in the form of wet methanol, eg: 25-50% water in methanol, thus avoiding local coagulation requiring extensive mixing and further carbonation to clarify. When this methylate containing one mol of water is mixed with the oil and sulfonate, usually 30-60% sulfonate, then evaporated free of methanol and solvent, it remains clear and fluid without trouble from gelling which usually occurs when the temperature reaches about 180° F. to 220° F. The product can be heated to 400° F. and above without difficulty. If more water is present, eg: 2 mols per atom of magnesium, the product is fluid and clear, requiring no filtration whatever. With only one mole of water, however, it is desirable to treat the oil further with water after removal of all methanol, to insure a hydrolytically stable, low viscosity oil. As indicated above, however, excessive amounts of water in the methanolic solution should be avoided, apparently not more than 3 to 5 mols per atom of magnesium.

Although I have described my invention by suggesting specific examples of its utility, I do not intend that it be limited thereby. Thus, the stabilized, carbonated magnesium-methanol complex can be used wherever it is desired to incorporate a colloidal dispersion of magnesium carbonate. For example, I may add it to a medicinal white oil containing a dispersing agent such as magnesium oleate, remove methanol and obtain a clear, colorless medicinal product, valuable for relief of constipation. Such a preparation was made as follows:

EXAMPLE 4

To 20 grams oleic acid diluted with xylene and 30 grams of 100 viscosity mineral oil was added 150 cc. magnesium carbonate solution of 92 alkali value as described in Example 1. The methanol and solvent were stripped off by heating to 370° F. Then the oil was treated with 10 cc. water and dehydrated. It was then filtered at a satisfactory rate using "Hy Flo" diatomaceous earth filter aid. The clear oil titrated 220 alkali value using methyl orange indicator.

I may also prepare oil dispersable magnesium carbonate in the form of a dry powder by adding to the methanol solution a small amount of a dispersing agent such as magnesium oleate or stearate, sulfonate or phosphonate, then evaporate the methanol and other solvent present. The amount of dispersant required is of the order of 2 to 20 percent of the weight of carbonate. Such a dry powder can be added to lubricating oils, hydraulic oils, greases, etc. to confer an alkali reserve where desired.

The analysis for sulfonate—Q.A.S.—referred to herein is the quaternary ammonium sulfonate method. The result is expressed in weight percent calcium as metal. The method is described in Analytical Chemistry, Volume 26, September 1954, pages 1492–97; also, in Technical Bulletin, Rohm & Haas Company, February 1960, "Assay of Hyamine Products."

Alkali value (or acid value) or "base number" is determined by ASTM Method D664–58, and the result is expressed in milligrams KOH equivalent per gram of sample.

Sulfated ash is determined by ASTM Method D874–59T.

Having thus described my invention, what I claim is:

1. The process of preparing a stable methanolic solution of magnesium and methanol comprising reacting magnesim with anhydrous methanol in the presence of a volatile aromatic hydrocarbon solvent in a dissolving zone at the temperature of boiling methanol, discharging liberated hydrogen and methanol vapors from said dissolving zone to a condensing zone wherein the vapors of methanol are condensed to a liquid, recycling condensed methanol to said dissolving zone, continuously conducting methanol, aromatic solvent and dissolved magnesium from said dissolving zone to a separate carbonation zone, injecting carbon dioxide into said carbonation zone, continuously recycling carbonated methanolic solution of magnesium from said carbonation zone to said dissolving zone and withdrawing a portion of the stable carbonated solution from said carbonation zone for use as desired.

2. The process of claim 1 wherein said volatile, aromatic hydrocarbon solvent in said dissolving zone is present in an amount sufficient to provide a ratio of solvent to methanol of about 1:1 to 1:3 by volume.

3. The process of claim 1 wherein continuous operation of the process is achieved by intermittently charging magnesium metal to said dissolving zone without interrupting the reaction between methanol and magnesium therein.

4. The process of claim 1 wherein carbon dioxide is simultaneously introduced directly into the said dissolving zone during the reaction, thereby increasing the rate of solution of metal in methanol and preventing precipitation of insoluble basic magnesium compounds from said solution.

5. The process of claim 1 wherein said aromatic hydrocarbon solvent is xylene.

6. The process of claim 1 wherein said aromatic solvent is present in the amount of about 25 to 50% based on the combined volume of methanol and solvent.

7. The process of preparing a clear, overbased magnesium dispersion in lubricating oil which comprises dissolving magnesium in methanol in the presence of a volatile aromatic hydrocarbon solvent to produce a clear solution of magnesium methylate, carbonating said solution by injecting carbon dioxide thereinto, treating the carbonated solution with water in the amount of about 1 to 2 mols per atom of magnesium, mixing the treated, clear solution with lubricating oil containing an oil soluble sulfonate dispersant, evaporating the methanol from the oil and colloidal carbonate complex and thereafter further treating with water and dehydrating the oil to yield an optically clear fluid dispersion of colloidal magnesium carbonate free of gelling tendency.

8. The process of claim 7 wherein the overbased magnesium dispersion in lubricating oil has an alkali value of about 300.

9. The process of preparing a stable clear solution of colloidal magnesium carbonate in methanol which comprises dissolving metallic magnesium in anhydrous methanol while simultaneously introducing carbon dioxide gas into the reaction at a rate sufficient to convert the magnesium into magnesium carbonate as rapidly as said metal is dissolved by said methanol.

10. The process of preparing a clear, overbased magnesium dispersion in lubricating oil having an alkali value above about 300, which comprises dissolving magnesium in methanol in the presence of a volatile aromatic hydrocarbon solvent and carbon dioxide to produce a clear colloidal solution of magnesium carbonate-methanol complex, combining the resulting solution with lubricating oil containing an oil soluble dispersant and about 1 to 2 mols of water for each atom of magnesium employed, evaporating methanol from the resulting mixture, then further treating with water to stabilize the oil.

References Cited

UNITED STATES PATENTS 2,895,913    7/1959    Carlyle et al. _____ 252—42.7 X
3,447,899    6/1969    Maskal et al. _____ 23—67

CARL F. DEES, Primary Examiner

U.S. Cl. X.R.

252—25